United States Patent [19]
Hepburn

[11] 3,789,320
[45] Jan. 29, 1974

[54] GAS LASER CIRCULATION SYSTEM

[75] Inventor: William Dunn Hepburn, Edinburgh, Scotland

[73] Assignee: Ferranti Limited, Hollinwood, Lancashire, England

[22] Filed: June 19, 1972

[21] Appl. No.: 263,948

[52] U.S. Cl. .............................................. 331/94.5
[51] Int. Cl. ........................................... H01s 3/02
[58] Field of Search .................................... 331/94.5

[56] References Cited
UNITED STATES PATENTS

| | | | |
|---|---|---|---|
| 3,391,281 | 7/1968 | Eerkens | 331/94.5 |
| 3,596,202 | 7/1971 | Patel | 331/94.5 |
| 3,634,778 | 1/1972 | Melikian et al. | 331/94.5 |
| 3,566,297 | 2/1971 | Blackman, Jr. | 331/94.5 |

Primary Examiner—William L. Sikes
Attorney, Agent, or Firm—Cameron, Kerkham, Sutton, Stowell & Stowell

[57] ABSTRACT

A gas circulation system for a laser comprises a reaction vessel comprising an empty tube which may be heated to an appropriate temperature, and means for circulating the gas from the laser through the reaction vessel so that the dissociation of the gas which occurs in use is reversed.

5 Claims, 1 Drawing Figure

3,789,320
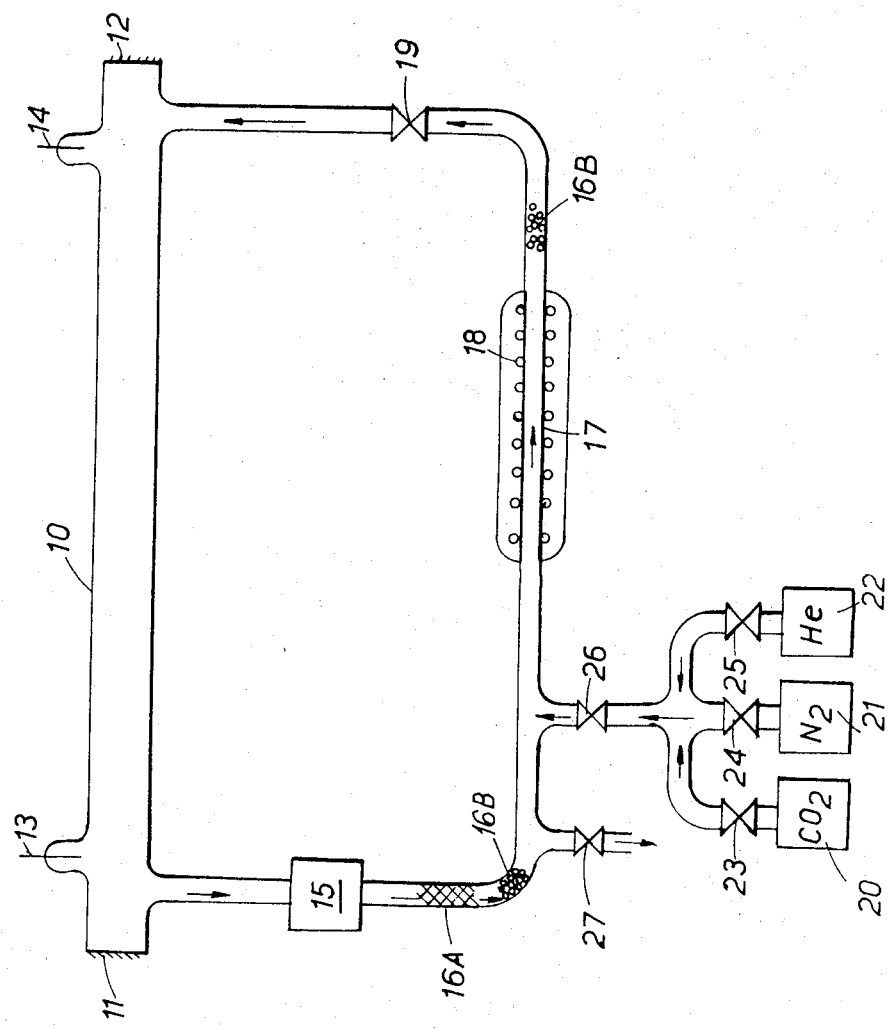

GAS LASER CIRCULATION SYSTEM

This invention relates to gas lasers and particularly to such lasers of the high-power carbon-dioxide type.

Certain high power gas lasers use as the active medium a mixture of carbon dioxide, nitrogen, and helium. It has been found that the performance of such a laser falls off if the gas mixture is allowed to remain in the tube, and for this reason it is usual to replenish the gas mixture, continously passing the mixture into the laser tube and venting it to the atmosphere. The disadvantage with this technique is that helium is an expensive material, and in the larger lasers a considerable quantity of helium is required.

It is believed that the fall-off in the performance of teh laser is due, at least in part, to a change in the chemical composition of the gas mixture. The most probable reaction is represented by the following reversible equation, though other products containing one or more of the elements carbon, nitrogen or oxygen may be formed.

$$CO_2 + N_2 + He \rightleftharpoons CO + N_2O + He.$$

The carbon dioxide and nitrogen are changed, at least in part, by the effects of the electric discharge used to excite the laser, and form carbon monoxide and nitrous oxide. The helium is not affected chemically.

It is an object of the invention to provide a gas circulation system for a laser such that the rate of replenishment of the gas in the laser is substantially reduced.

It is a further object of the invention to provide a laser having such a gas circulation system.

According to the present invention there is provided a gas circulation system for a laser comprising a reaction vessel, means for circulating the gas used in the laser through the reaction vessel, and means for maintaining the reaction vessel at a temperature at which at least some of the dissociation of the gas occurring in the laser is reversed.

An embodiment of the invention will now be described with reference to the accompanying drawing. This shows, in schematic form, a laser tube and the associated gas circulation system.

Referring now to the drawing, the laser itself is shown in a simplified form as comprising a tube 10 having a pair of end mirrors 11 and 12, and being provided with two discharge electrodes 13 and 14. The remainder of the drawing shows the gas circulation system. Gas is extracted from the laser discharge tube by means of a pump 15, and is passed through an oil-mist filter 16A and a silica-gel trap 16B to remove any water vapour or contamination due to the pump itself. After passing through the filter the gas mixture passes through a reaction vessel in the form of an otherwise empty alumina tube 17 heated by a heating element 18, and thence through a further silica-gel trap 16B if required, to remove any water vapour or organic vapours. The gas mixture then returns through a throttle valve 19 to the laser discharge tube 10. The circuit between the throttle valve 19 and the pump 15 via the laser tube 10 is maintained at the low pressure required to operate the laser, in the range 10 to 100 torr whilst the remainder of the circuit is at a higher pressure, usually at or slightly above atmospheric pressure.

In order to allow for gas leakage from the system sources of the three gases are provided as shown at 20, 21, and 22, each being provided with a stop valve 23, 24 and 25 respectively. The gas mixture is bled into the high-pressure side of the circulation system by means of a bleed valve 26. A pressure-relief valve 27 is also provided in the high-pressure side of the system, and communicates with the atmosphere.

The arrangement of silica-gel traps described above may be varied, and other types of filter may be used. The oil-mist filter is necessary only if the pump is of a type which may introduce oil contamination.

The rate of usage of the make-up gases from sources 20, 21 and 22 will be very small compared with the quantities required when the circulating gas mixture is exhausted direct to the atmosphere. It may be desirable to use flow-meters at various points in the circulation system, though these have not been shown in the drawing. The gases may, of course, be pre-mixed and drawn from a single cylinder.

In operation the heating element 18 is arranged to maintain the alumina tube 17 at a temperature of about 700°C. At this temperature the re-combination reaction occurs at the required rate. It may be necessary to cool the gases before passing them back into the laser discharge tube.

The reaction vessel may be made of other materials than alumina. For example, silica and mullite are possible alternatives. Generally the material must be one which is inert to the gases passing through it.

The use of a pressure equal to or greater than atmospheric pressure in that part of the system which includes the reaction vessel ensures that any leaks which occur involve the emission of gas from the system. This is to be preferred to the possible ingress of contamination from outside which would occur if the pressure was less than atmospheric. It should also be remembered that the higher the pressure the higher is the reaction rate, and the relatively high pressure avoids the necessity to use a catalyst in the reaction vessel.

What I claim is:

1. A gas laser which includes a discharge tube containing a mixture of gases, means for exciting the gas mixture to cause laser action and dissociation of the gas in the discharge tube, and a closed-circuit gas circulation system comprising a reaction vessel, means for circulating the gas mixture through the reaction vessel, means for maintaining the gas mixture in the reaction vessel at a pressure greater than that in the discharge tube, and means for maintaining the reaction vessel at a temperature at which at least some of the dissociation of the gas occurring in the discharge tube is reversed.

2. A gas circulation system as claimed in claim 1 in which the gas in that part of the circulation system which includes the reaction vessel is maintained, in operation, at a pressure at least equal to atmospheric pressure.

3. A laser as claimed in claim 1 in which the reaction vessel is made from a material selected from the group consisting of alumina, silica and mullite.

4. A laser as claimed in claim 1 in which the reaction vessel is maintained, in operation, at a temperature of the order of 700°C.

5. A laser as claimed in claim 1 which includes means for replenishing any of the constituents of the gas mixture.

* * * * *